US008452880B2

(12) United States Patent
Jain

(10) Patent No.: US 8,452,880 B2
(45) Date of Patent: May 28, 2013

(54) SYSTEM AND METHOD FOR VERIFYING INTENDED CONTENTS OF AN ELECTRONIC MESSAGE

(75) Inventor: Anuj Jain, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 1743 days.

(21) Appl. No.: 10/744,670

(22) Filed: Dec. 22, 2003

(65) Prior Publication Data

US 2005/0138127 A1    Jun. 23, 2005

(51) Int. Cl.
*G06F 15/16* (2006.01)

(52) U.S. Cl.
USPC ........... 709/229; 709/219; 709/225; 707/697; 707/698

(58) Field of Classification Search
USPC ............... 709/201, 202, 203, 204, 205, 206, 709/229, 217, 225; 707/687, 697, 698
See application file for complete search history.

(56) References Cited

U.S. PATENT DOCUMENTS

| | | | | |
|---|---|---|---|---|
| 6,012,087 | A * | 1/2000 | Freivald et al. | 709/218 |
| 6,085,322 | A * | 7/2000 | Romney et al. | 713/176 |
| 6,088,451 | A * | 7/2000 | He et al. | 726/8 |
| 6,219,818 | B1 * | 4/2001 | Freivald et al. | 714/799 |
| 6,298,445 | B1 * | 10/2001 | Shostack et al. | 726/25 |
| 6,510,462 | B2 * | 1/2003 | Blumenau | 709/224 |
| 6,519,629 | B2 * | 2/2003 | Harvey et al. | 709/204 |
| 6,640,301 | B1 * | 10/2003 | Ng | 713/156 |
| 6,804,700 | B1 * | 10/2004 | Terek et al. | 709/203 |
| 6,820,199 | B2 * | 11/2004 | Wheeler et al. | 713/170 |
| 6,820,202 | B1 * | 11/2004 | Wheeler et al. | 713/185 |
| 7,003,565 | B2 * | 2/2006 | Hind et al. | 709/224 |
| 7,007,068 | B2 * | 2/2006 | Morkel | 709/206 |
| 7,096,500 | B2 * | 8/2006 | Roberts et al. | 726/24 |
| 7,325,145 | B1 * | 1/2008 | England | 713/187 |
| 7,685,296 | B2 * | 3/2010 | Brill et al. | 709/228 |
| 7,720,833 | B1 * | 5/2010 | Wen et al. | 707/706 |
| 2002/0004899 | A1 * | 1/2002 | Azuma | 713/152 |
| 2002/0013825 | A1 * | 1/2002 | Freivald et al. | 709/218 |
| 2002/0016818 | A1 * | 2/2002 | Kirani et al. | 709/203 |
| 2002/0169854 | A1 * | 11/2002 | Tarnoff | 709/219 |
| 2003/0079143 | A1 * | 4/2003 | Mikel et al. | 713/200 |
| 2004/0143796 | A1 * | 7/2004 | Lerner et al. | 715/538 |
| 2005/0071766 | A1 * | 3/2005 | Brill et al. | 715/738 |
| 2005/0091545 | A1 * | 4/2005 | Soppera | 713/202 |

* cited by examiner

*Primary Examiner* — Dhairya A Patel

(74) *Attorney, Agent, or Firm* — Kilpatrick Townsend & Stockton LLP

(57) ABSTRACT

Embodiments of the present invention include a method and system for verifying intended contents of an electronic message comprising: accessing an electronic message destined for a recipient comprising a link to an intended data source. The method further includes accessing the intended data source and computing a first message digest value associated with the intended data source. Additionally, the method includes sending the electronic message and the first message digest value to the recipient. The recipient side may check the message digest value against a recently generated value and alert the recipient of any digest mismatch that represents a recent change in the intended data source.

4 Claims, 6 Drawing Sheets

SYSTEM AND METHOD FOR VERIFYING INTENDED CONTENTS OF AN ELECTRONIC MESSAGE

TECHNICAL FIELD

The field of the invention relates to electronic communications. More specifically, embodiments of the present invention relate to verifying intended contents of an electronic message.

BACKGROUND ART

Computer users, in their daily course of activities, send electronic messages containing URL links to their friends, family and coworkers involving items of personal interest or work related subject matter. For instance, a user may send a particular URL link to someone they think might enjoy it via an email, instant message, or any other electronic messaging system. Furthermore, the URL link may contain data content such as a word document, a PDF document, a gif image or plain text.

Consider the following case when the contents of an intended URL link change after the message containing the URL has been sent. For example, suppose one co-worker sends a second co-worker an email containing a URL link pointing to an image that contains a joke that the sender finds funny. After the message has been sent, the contents of the pointed URL are modified by the site owner with inappropriate contents. When the receiver opens the email and clicks on the URL link, he/she finds the new contents offensive. There is a possibility that the relationship between the co-workers will be compromised. More damaging would be if the sender had sent the email to a distribution list, thereby offending many individuals inadvertently.

DISCLOSURE OF THE INVENTION

A system and method for verifying the intended contents of an electronic message would be an improvement over the art. Accordingly a system and method for verifying intended contents of an electronic message are disclosed. Embodiments of the present invention include a method for verifying intended contents of an electronic message comprising accessing an electronic message destined for a recipient comprising a link to an intended data source. The method further includes accessing the intended data source and computing digest value, e.g., a first checksum value, associated with the intended data source. Additionally, the method includes sending the electronic message and the digest value to the recipient.

Additional embodiments of the present invention include the recipient receiving the electronic message and accessing the digest value associated with the intended data source. The method further includes accessing the intended data source and computing a second digest value, e.g., a checksum, associated with the intended data source. The method further includes comparing the original digest value and the second digest value and provided they do not match, the method further comprises alerting the recipient that the intended data source has changed since the original digest value was calculated. Alternatively, if the digests match, the recipient is unaware of the activity herein described as it is transparent in the matching digest case.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Figure 1:
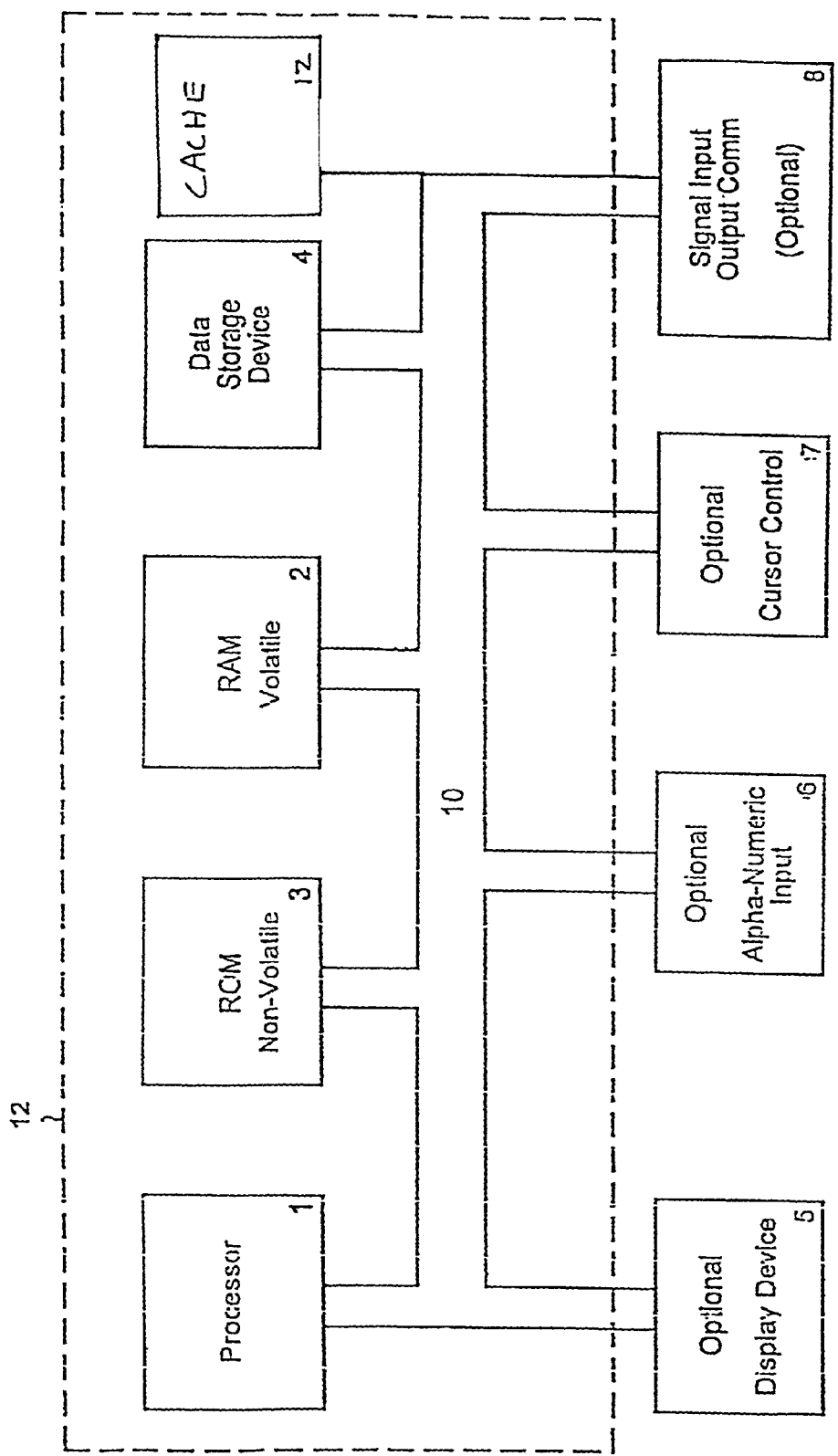
FIG. 1 is a block diagram of an exemplary computer system in accordance with embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "retrieving," "accessing," "verifying," "comparing," "sending," "receiving," "entering", "computing" or the like, refer to the action and processes (e.g., process 500 and 600) of a computer or computerized server system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, a block diagram of exemplary computer system 12 is shown. It is appreciated that computer system 12 of FIG. 1 described herein illustrates an exemplary configuration of an operational platform upon which embodiments of the present invention can be implemented. Nevertheless, other computer systems with differing configurations can also be used in place of computer system 12 within the scope of the present invention. For example, computer system 12 could be any electronic computing scheme, e.g., a server system, a personal computer or an embedded computer system.

Computer system 12 includes an address/data bus 10 for communicating information, a processor 1 (e.g., a central processing unit) coupled with bus 10 for processing information and instructions, a cache 12 coupled to bus 10 for temporarily storing data, a volatile memory unit 2 (e.g., random access memory, static RAM, dynamic RAM, etc.) coupled with bus 10 for storing information and instructions for processor 1 and a non-volatile memory unit 3 (e.g., read only memory, programmable ROM, flash memory, EPROM, EEPROM, etc.) coupled with bus 10 for storing static information and instructions for processor 1. Computer system 12 may also contain an optional display device 5 coupled to bus 10 for displaying information to the computer user. Moreover, computer system 12 also includes a data storage device 4 (e.g., disk drive) for storing information and instructions.

Also included in computer system 12 of FIG. 1 is an optional alphanumeric input device 6. Device 6 can communicate information and command selections to processor 1. Computer system 12 also includes an optional cursor control or directing device 7 coupled to bus 10 for communicating user input information and command selections to processor 1. Computer system 12 also includes signal communication interface 8, which is also coupled to bus 10, and can be a serial port.

A System and Method for Verifying Intended Contents of an Electronic Message

Embodiments of the present invention include a computer implemented method for generating a message digest for electronic messages comprising links to an intended data source. In one embodiment of the invention, the electronic message is an instant message or an electronic mail message, but it is appreciated that the electronic message could be any form of an electronic notification that is sent between a sender and a receiver, or multiple receivers, such as a multicast electronic message to a group of members. In one embodiment of the invention, the message digest comprises a checksum value that is computed based on the contents of the intended data source. The message digest is sent along with the electronic message when it is sent to the recipient(s), e.g., sent within the message or associated with the message. Upon receiving the message or upon the message being selected for reading, on the receiver end, the intended data source is accessed and a second checksum value is calculated based on the current contents of the intended data source. If the checksum values do not match, the recipient is warned that the contents of the intended data source may have changed since the message was sent.

Figure 2:
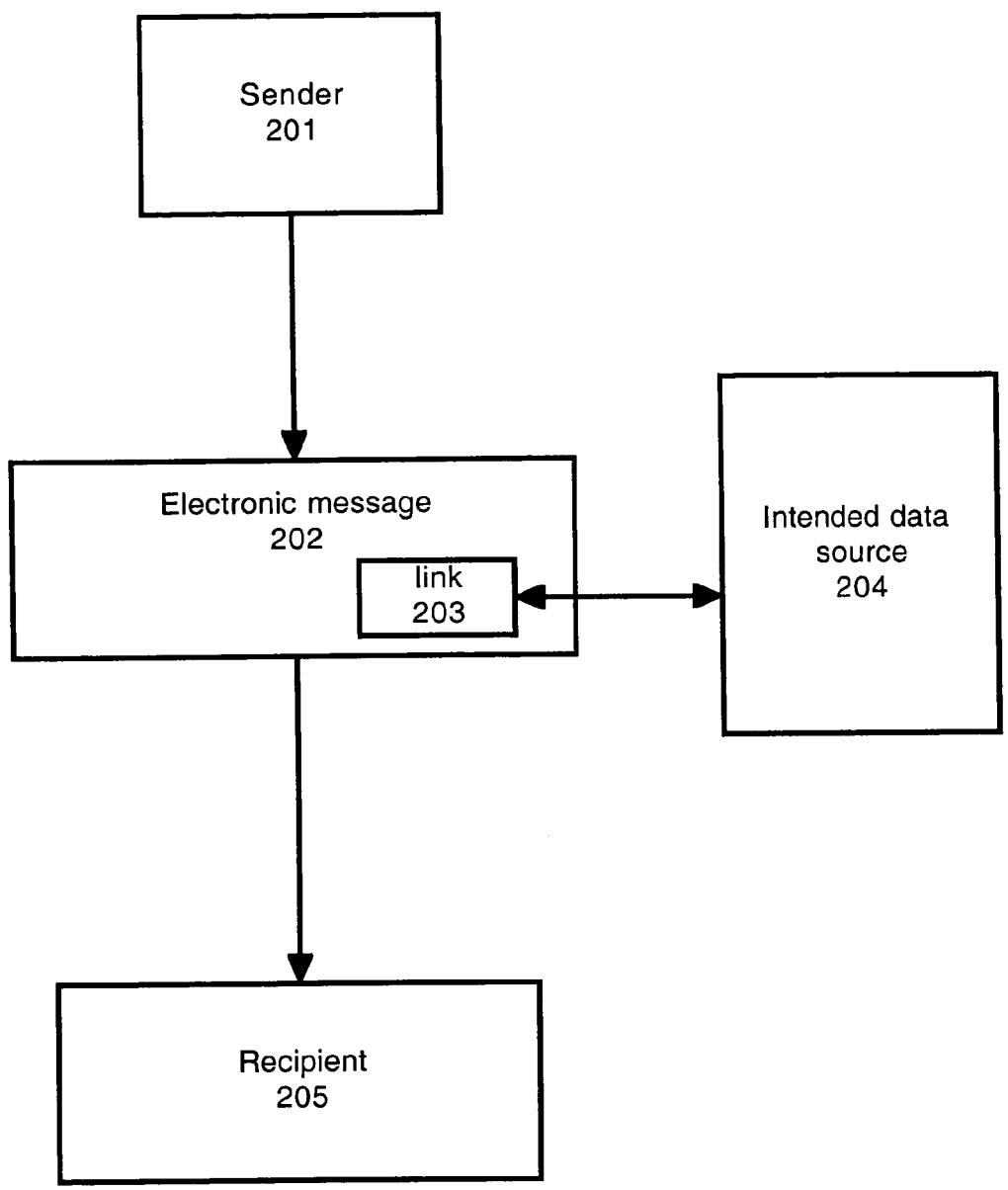
FIG. 2 is a data flow diagram of an exemplary electronic messaging environment wherein an electronic message comprises a link to an intended data source in accordance with embodiments of the present invention.

FIG. 2 is a data flow diagram of an exemplary electronic messaging environment 200 wherein an electronic message comprises a link to an intended data source in accordance with embodiments of the present invention. In this embodiment of the invention, the sender 201 creates an electronic message 202 that comprises a link 203 to an intended data source 204. The link, in one embodiment of the invention may be a URL pointing to a web page on the Internet or an Intranet site. The recipient 205 receives and typically stores the electronic message 202 comprising the link 203 to the intended data source 204. This form of linking to an extended site 204 is very popular because it reduces the size of the message 202 because the subject matter of the link 203 is already incorporated into the message 202 by reference.

Figure 3:
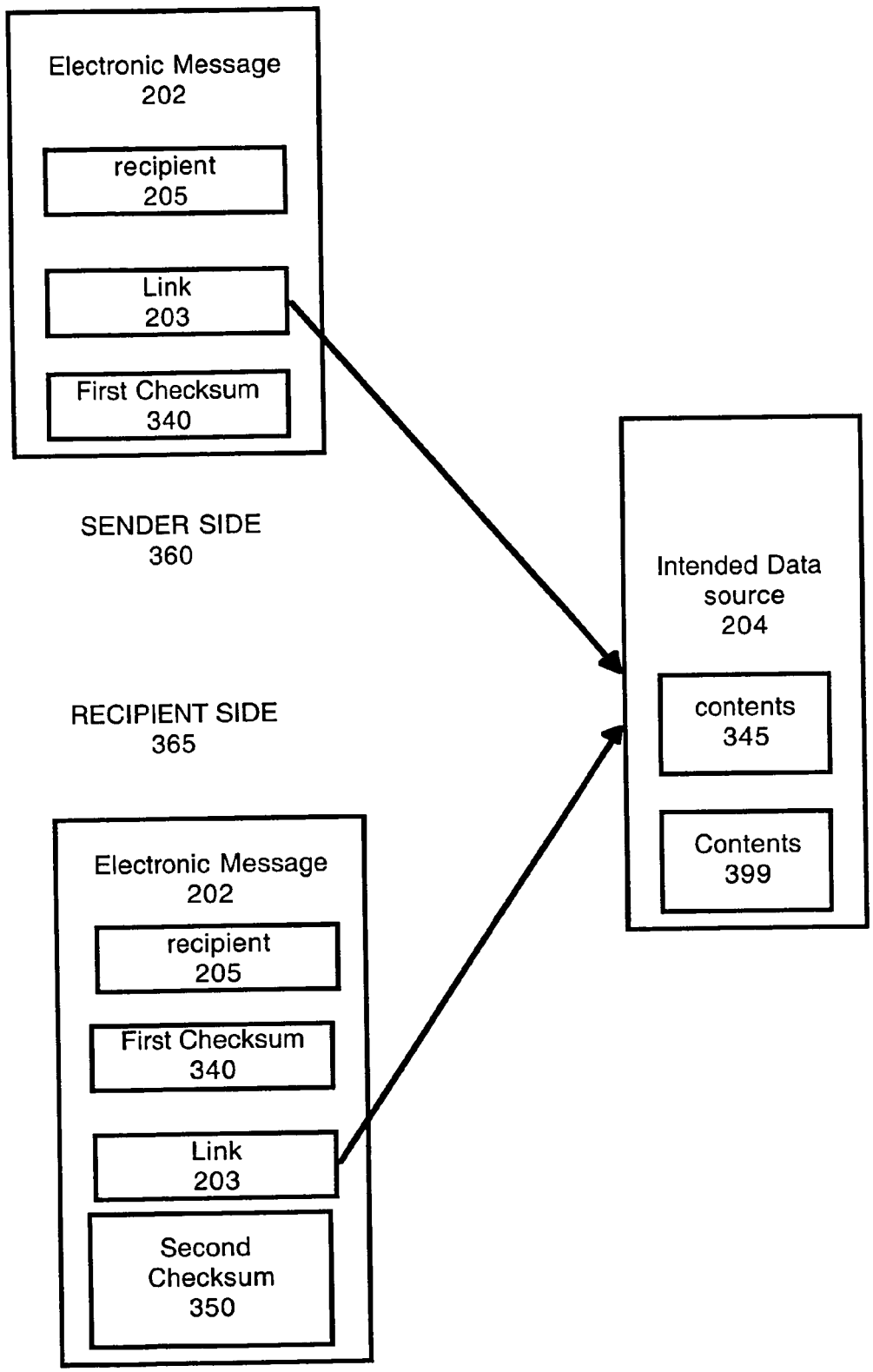
FIG. 3 is a block diagram of an exemplary electronic messaging system wherein checksum values are used to verify intended contents of an electronic message in accordance with embodiments of the present invention.

FIG. 3 is a block diagram of an exemplary electronic messaging system 300 wherein content digests, e.g., checksum values, are used to verify intended contents of an electronic message in accordance with embodiments of the present invention. On the sender side, 360, a sender composes an electronic message 202 addressed to a recipient 205. The electronic message 202 comprises a link 203 to an intended data source 204 that comprises contents 345. In one embodiment of the invention, the link 203 is a URL and the intended data source 204 is a web page on the Internet. The content could be any information capable of being represented in a web page or Internet based format. For example, the contents 345 could be a picture or document posted on a particular web page on the Internet. Before the electronic message is sent to the recipient 205, a first checksum value 340 is calculated based, e.g., at the sender side, on the contents 345 of the intended data source 204. The first checksum value is then sent along with the electronic message 202 to the recipient 205. The checksum value may be embedded inside the message 202. In one embodiment of the invention, the recipient 202 may be a group of people, for example, members of a conversation group that receives a multicast message.

Upon receiving the electronic message 202, or upon a selection to access the message 202 for reading, on the recipient side 365, the intended data source 204 is accessed and a second checksum value 350 is computed based on the contents 399 of the intended data source 204. If the intended data source 204 were modified after the electronic message 202 was sent from the sender side 360, a different checksum value will be computed. As a result, the recipient will be notified that the contents 345 of the intended data source were modified since the electronic message 202 was sent. The recipient then has the option of blocking the link contents 345. The process described herein is transparent to the recipient upon a checksum match. In the case of a match, the contents 345 match contents 399. On a mismatch, contents 399 do not match contents 345.

Figure 4:
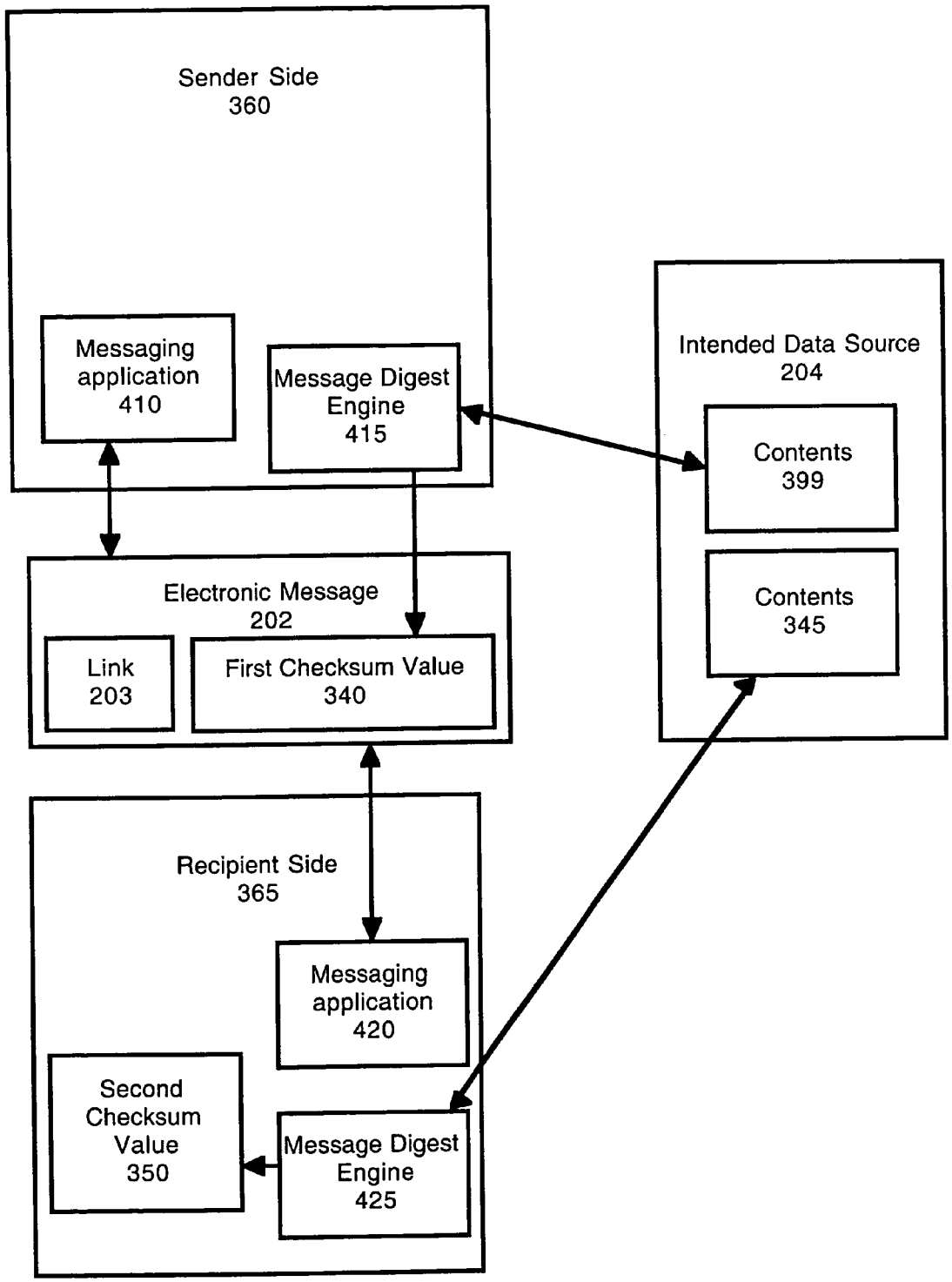
FIG. 4 is an illustration of an exemplary system for verifying intended contents of an electronic message in accordance with embodiments of the present invention.

FIG. 4 is an illustration of an exemplary system for verifying intended contents of an electronic message in accordance with embodiments of the present invention. In this embodiment of the invention, on the sender side 360, there is a message digest engine 415 that generates a message digest comprising a first checksum value 340 based on the contents 345 of the intended data source 204 that link 203 points to. A messaging application 410 is used to generate and send electronic message 202. The electronic message 202 is sent along with the message digest created on the sender side 360 comprising a first checksum value 340. The electronic message also comprises link 203 that points to the intended data source 204.

On the recipient side 365, a messaging application 420 receives the electronic message 202. In one embodiment of the invention, a message digest engine 425 examines the electronic message 202 for any links that point to an intended data source. In another embodiment of the invention, the messaging application is notified that the electronic message 202 comprises a link 203 by examining the first checksum value 340. Once the link 203 is identified, the contents 399 of the intended data source 204 are accessed. In one embodiment of the invention, the contents 345 are downloaded in the background when the electronic message is received by the messaging application 420. In another embodiment of the invention, the contents are accessed when the recipient clicks on link 203. In the case of a match, the contents 345 match contents 399. On a mismatch, contents 399 do not match contents 345.

Once the contents 399 are accessed, a second checksum value 350 is computed based on the contents 399 of the intended data source 204. If the first checksum value 340 and the second checksum value 350 do not match, it can be determined that the contents 345 of the intended data source 204 have been modified since the electronic message 202 was sent and therefore contents 399 do not match contents 345. If the first checksum value 340 and the second checksum value 350 match, it can be determined that the recipient of the electronic message 202 accessed the correct contents 345 of the intended data source 204 and that contents 399 match contents 345. In one embodiment of the invention, when the first checksum value 340 and the second checksum value 350 do not match, the recipient is alerted with a warning that the contents 345 may have been modified since the electronic message 202 was sent and may be given an opportunity to avoid the contents 345.

Figure 5:
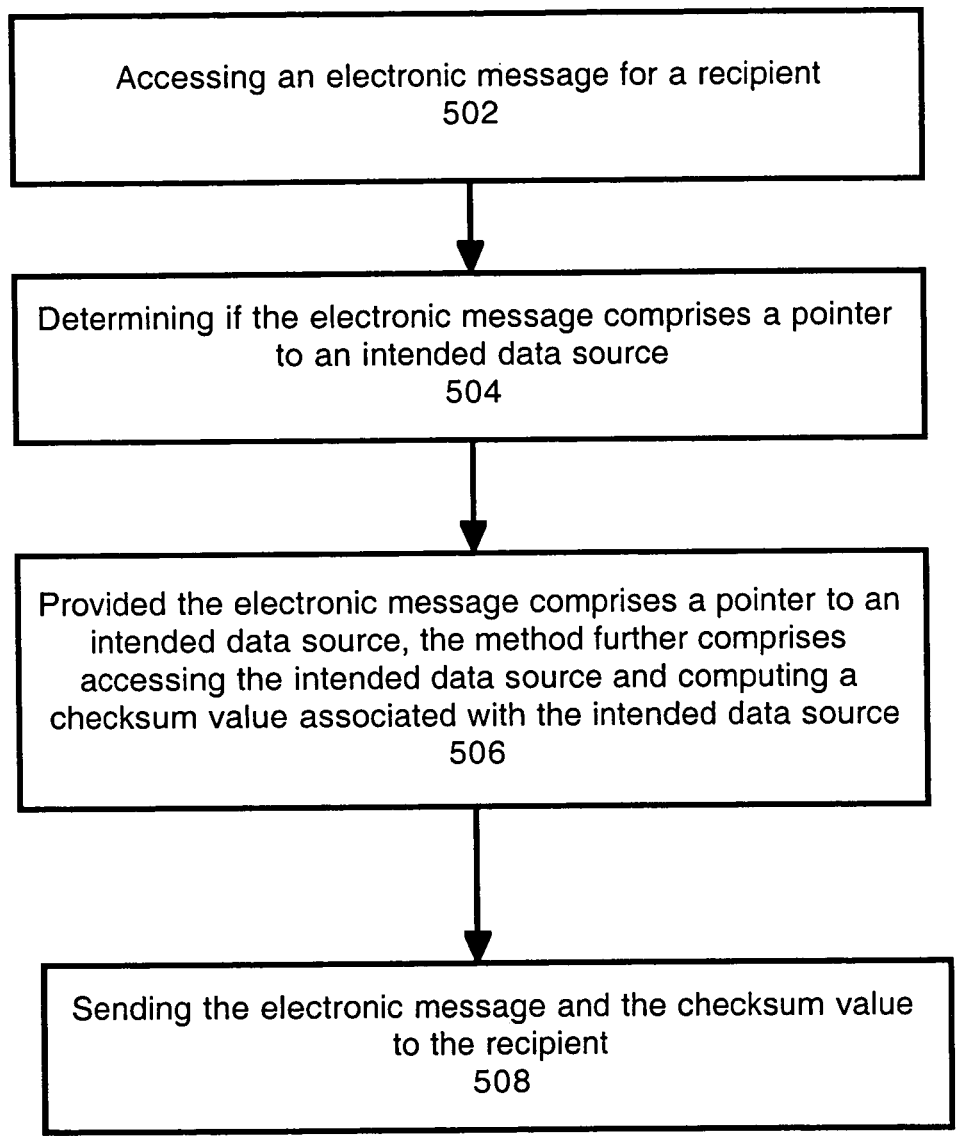
FIG. 5 is a flow diagram of an exemplary computer implemented method for sending an electronic message in accordance with embodiments of the present invention.

FIG. 5 is a flow diagram of an exemplary computer implemented method 500 for sending an electronic message in accordance with embodiments of the present invention. The first step 502 is accessing an electronic message for a recipient. The next step 504 is determining if the electronic message comprises a pointer (e.g., link) to an intended data source. As stated above, the link may be a URL to a web page on the Internet or could be any other pointer to any data source. Provided the electronic message comprises a pointer to an intended data source, the next step 506 is accessing the intended data source and computing a first checksum value associated with the intended data source. In one embodiment of the invention, the first checksum value is calculated based on the contents of the intended data source. The next step 508 is sending the electronic message and the first checksum value to the recipient. In one embodiment of the invention, a message digest is sent along with the electronic message. In this embodiment of the invention, the checksum value is included in the message digest. The message digest can be sent in the header portion of the electronic message, it can be attached as an attachment to the electronic message, it can be included in the text body of the electronic message or can be included in any one of numerous ways for sending data that are well-known in the art.

Figure 6:
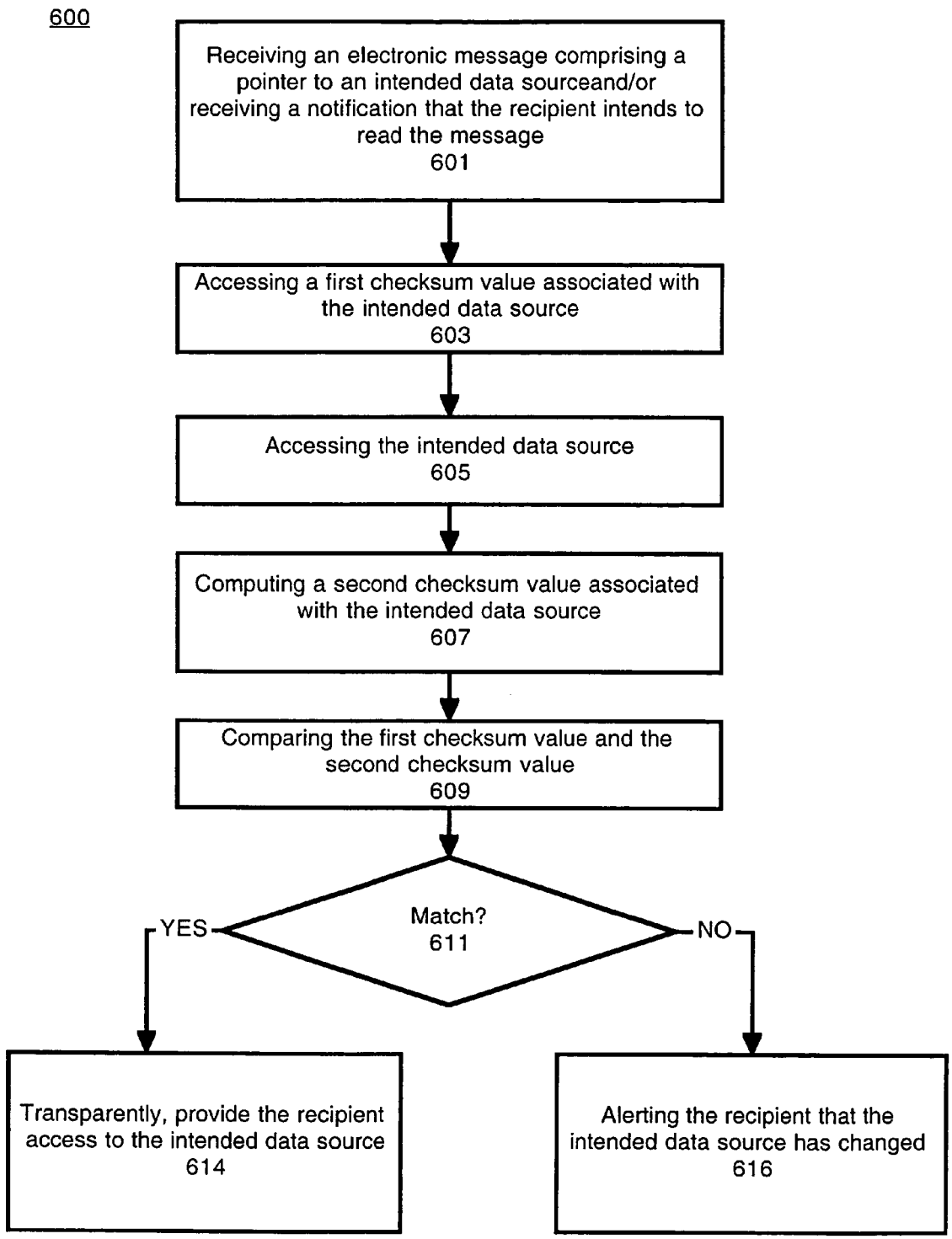
FIG. 6 is a flow diagram of an exemplary computer implemented method for receiving an electronic message in accordance with embodiments of the present invention.

FIG. 6 is a flow diagram of an exemplary computer implemented method 600 for receiving an electronic message in accordance with embodiments of the present invention. The first step 601 is receiving an electronic message comprising a pointer to an intended data source. The next step 603 is accessing a first checksum value associated with the intended data source. The next step 605 is accessing the intended data source. Alternatively, process 600 may be invoked in response to the recipient selecting the message for reading, at 601. As stated above, in one embodiment of the invention, step 605, accessing the intended data source, is performed while the electronic message is being received. In this embodiment of the invention, this step is performed as a background operation.

The next step 607 is computing a second checksum value associated with the intended data source. As stated above, in one embodiment of the invention, the second checksum value is computed based on the contents of the intended data source. The next step 609 is comparing the first checksum value and the second checksum value. In step 611, a match is determined. Provided the first checksum value and the second checksum value do not match, the next step 616 is alerting the recipient that the intended data source may have been modified since the electronic message was sent (e.g., since the first checksum value was calculated). Provided the checksum values match, in step 614, the recipient is transparently provided access to the intended data source. In one embodiment of the invention, a message digest is generated using MD5, SH, SH1, JAVA, or any other well-known heuristic for computing a message digest that uniquely identifies the data it represents.

Embodiments of the present invention include a method for generating a message digest for electronic messages comprising links to an intended data source. The message digest is sent along with the electronic message when it is sent to the recipient(s). Upon receiving the message, on the receiver end, the intended data source is accessed and a second checksum value is calculated based on the contents of the intended data source. If the checksum values do not match, the recipient is warned that the contents of the intended data source may have changed since the message was sent. Embodiments of the present invention allow a recipient to verify that the contents of an intended data source are the same as when the message was sent.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for verifying intended content of an electronic message, the method comprising:

accessing a Universal Resource Locator (URL) embedded within an email message to be sent to an email recipient by an email sender via a mail server, wherein the URL is directed to a web page;

prior to the email message being sent, retrieving the webpage and computing a first digest value associated with said webpage at a first time, wherein said webpage is provided by a web server that is separate from said mail server and the first digest value is used to verify whether the webpage content has changed;

upon accessing said webpage and computing said first digest value, sending said email message with said embedded URL and said first digest value to said email recipient, wherein said first digest value is attached to said email message;

receiving said email message with said embedded URL;
accessing said first digest value after the email message has been received;
using said URL, accessing said webpage residing at a location separate from said email message;
downloading contents of the webpage to the email recipient's computer system;
computing a second digest value associated with said webpage based on the downloaded contents of the webpage at a second time, wherein the second digest value is used in conjunction with the first digest value to verify whether:
the webpage content has changed,
the URL is directed to a webpage that is different from the webpage which the URL was originally directed to, and the contents of the URL itself have changed;
activating a second message digest engine and a comparator upon said receiving said email message;
determining, by said second digest engine and said comparator, that said first digest value and said second digest value fail to match and verifying that the webpage content has changed, wherein said first and second digest values are checksum values,
in response to determining that the first digest value and the second digest value fail to match, determining that the contents of the webpage at the second time have changed from the contents of the webpage at the first time; and
in response to determining that said first digest value and said second digest value fail to match, blocking said email recipient access to said webpage and generating a warning message to the receiver indicating that the webpage has changed since it was sent from the email sender to the email recipient, wherein the blocking of the access to the webpage is to restrict display of the webpage, in response to the webpage having been changed since it was sent.

2. The method as recited in claim 1 further comprising: providing that said first digest value and said second digest value match, wherein allowing access by said email recipient to said webpage.

3. An electronic system comprising a processor coupled to a bus and a memory coupled to said bus, said memory comprising instructions for verifying intended contents of an electronic message, said memory further comprising:
a first application for allowing a composition of an email message comprising a Universal Resource Locator (URL) and for sending said email message to an email recipient, wherein said email message is operable for rendering on a display;
a first message digest engine at an email sender of said email message for accessing an webpage referenced by the URL embedded in said email and for generating a first message digest value at a first time therefrom, wherein said first message digest value is embedded in said email message to said email recipient and the first message digest value is used to verify whether the webpage content has changed, whether the URL is directed to a webpage that is different from the webpage which the URL was originally directed to, and whether the contents of the URL itself have changed;
a second application for receiving said email message;
a second message digest engine for accessing said webpage referenced by said URL embedded in said email message, wherein said webpage resides at a location separate from said email message, downloading contents of the webpage to the email recipient's computer system, and wherein said second message digest engine further generates a second message digest value based on the downloaded contents of the webpage at a second time, wherein the second message digest value is used in conjunction with the first message digest value to verify whether the webpage content has changed and wherein said first and second message digests digest values are checksum values;
a comparator for comparing said first message digest value and said second message digest value to detect changes in said webpage, wherein in response to the first message digest value and the second message digest value failing to match and verifying that the webpage content has changed, determining that the contents of the webpage at the second time have changed from the contents of the webpage at the first time; and
an alarm for notifying said recipient of said changes in said webpage upon a message digest mismatch by generating a warning message for said recipient,
wherein in response to the notifying of said changes in said webpage, the second application is further configured to block said email recipient access to said webpage and to indicate that the webpage has changed since it was sent from the email sender to the email recipient, wherein the blocking of the access to the webpage is to restrict display of the webpage on the display, in response to the webpage having been changed since it was sent, and
wherein said comparator and said second message digest engine are activated upon said recipient receiving said email message.

4. The system as recited in claim 3 wherein said comparator and said second message digest engine are activated upon said email recipient accessing said webpage.

* * * * *